Patented Jan. 21, 1930

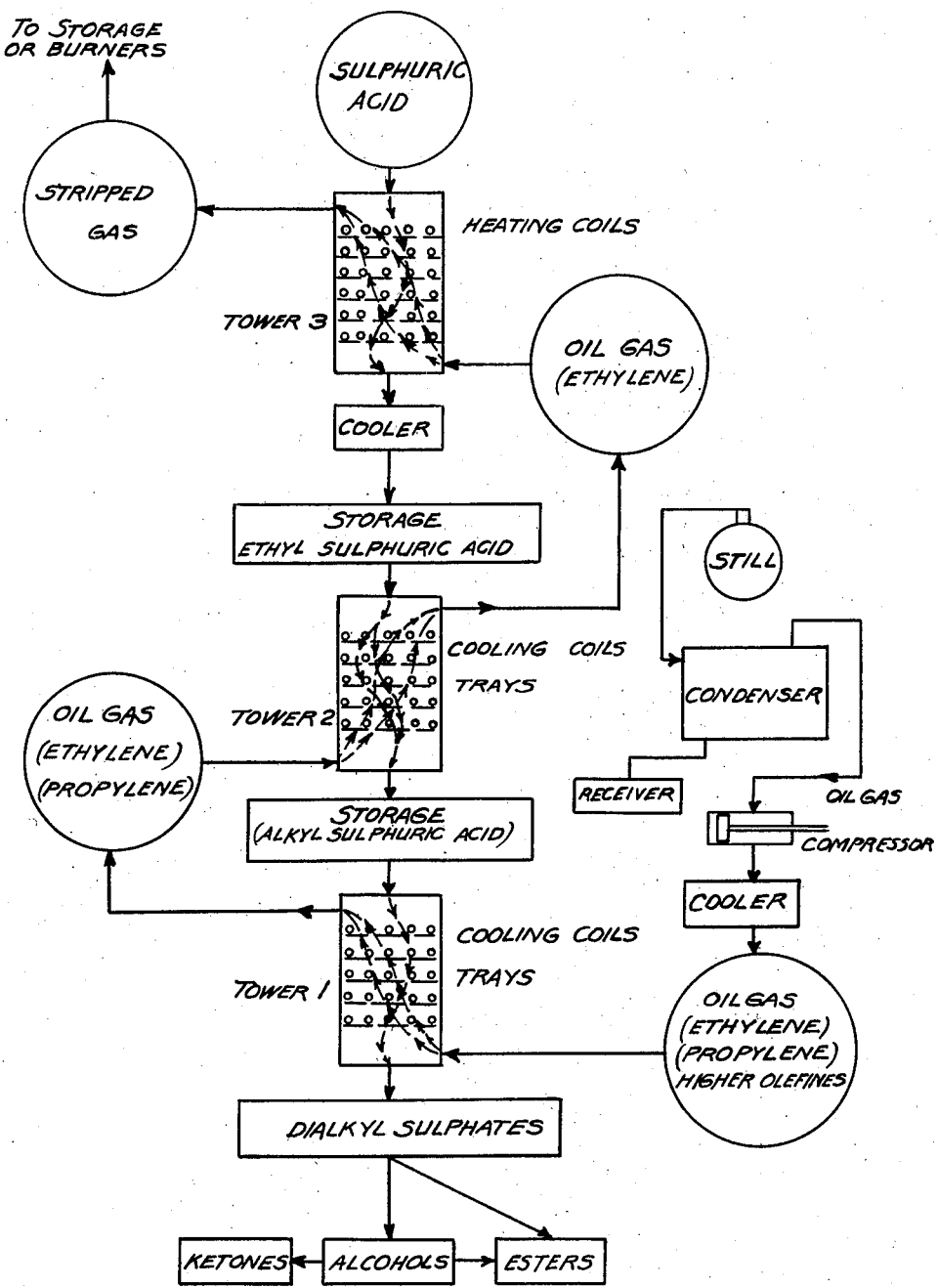

1,744,227

UNITED STATES PATENT OFFICE

ROBERT M. ISHAM, OF OKMULGEE, OKLAHOMA, ASSIGNOR, BY MESNE ASSIGNMENTS, TO SETH B. HUNT, TRUSTEE, OF MOUNT KISCO, NEW YORK

PRODUCTION OF DIALKYL SULPHATES

Application filed March 16, 1923. Serial No. 625,486.

This invention relates to the production of dialkyl sulphates. More particularly, the invention relates to the extraction of ethylene, propylene, amylene, and other olefines from oil gas to produce dialkyl sulphates and other valuable products therefrom.

The dialkyl sulphates are neutral organic compounds of great value as a starting point for the preparation of many organic compounds. Alcohols, ketones and esters may be prepared from dialkyl sulphates with ease, and a preparation of dialkyl sulphates leads therefore to the production of many other organic compounds. The esters which may be derived from the higher dialkyl sulphates, such as isopropyl amyl sulphate, are compounds having properties analogous to the ordinary banana oil of commerce, and may therefore be used as a substitute for this material for the ordinary uses to which it is put.

In the commercial cracking of petroleum oil to obtain gasoline and other oil fractions therefrom there is always a large amount of oil gas or still gas which is formed in the process which contains a very considerable proportion of unsaturated hydrocarbons. The gasoline and other fractions produced in the process also contain some unsaturated hydrocarbons which must be removed therefrom because of the unstable character of these compounds. If unsaturated hydrocarbons are not removed from the various oil fractions they tends to unite with each other or to polymerize on standing and form hydrocarbons of higher molecular weight.

The primary object of the present invention is to provide a process of separating unsaturated hydrocarbons from petroleum products by which the unsaturated hydrocarbons may be recovered, and by which polymerization and resinification of the unsaturated hydrocarbons may be substantially prevented.

Another object of the invention is to provide a process of separating unsaturated hydrocarbons in such a manner that they may be readily available for converting into other organic compounds.

A further object of the invention is to provide a process of removing amylene and higher olefines from oil gas whereby they may be substantially completely removed therefrom by sulphating without the use of sulphuric acid ($H_2SO_4$) which acid has a strong tendency to polymerize the higher olefines.

With these and other objects in view the invention consists in a new composition of matter and a process of separating unsaturated hydrocarbons from oil gas whereby a new composition of matter is obtained, as is hereinafter described and particularly defined in the claims.

The present invention is based upon the discovery that the higher olefines such as butylene, amylene, hexylene and heptylene may be substantially completely absorbed in a lower alkyl sulphuric acid, such as ethyl and isopropyl sulphuric acid, with the production of neutral dialkyl sulphates.

Heretofore it has been customary to use sulphuric acid ($H_2SO_4$) for carrying on the absorption of olefines from oil gas and the absorption was controlled so as to obtain acid suplhate without utilizing all of the sulphuric acid employed as the absorption agent. In the present invention, however, a normal sulphate is obtained together with some acid sulphate and therefore a very much larger amount of olefines in proportion to the quantity of sulphuric acid employed may be absorbed according to the present process. Furthermore, the use of alkyl sulphuric acid in absorbing olefines permits the use of higher temperatures in absorption without excessive polymerization taking place, and the rate of reaction is not so rapid as to form tars which usually result from a process of this kind. In other words, in order to obtain products of maximum value, the reactions herein described are carried on under sulphating conditions, by which is meant conditions whereby the reaction is substantially directed to the production of sulphated products and reactions productive of tarry, resinous and charred products in substantial proportions are avoided, so far as practicable.

The reactions upon which the process depends may be illustrated by the reactions which take place with ethylene, propylene, and higher olefines such as amylene.

Ethylene which is present in the oil gas treated is absorbed in concentrated sulphuric acid of substantially 66° Bé. strength at a temperature of approximately 80° to 90° C. with the formation of ethyl sulphuric acid according to the following equation:

1. 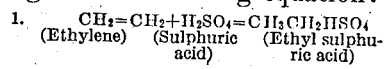
(Ethylene) (Sulphuric acid) (Ethyl sulphuric acid)

Propylene reacts with the sulphuric acid in the cold or at temperatures below 30° C. with a formation of isopropyl sulphuric acid, the reaction taking place according to the following equation:

2. 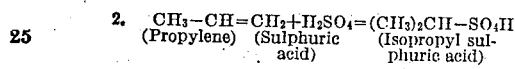
(Propylene) (Sulphuric acid) (Isopropyl sulphuric acid)

This reaction between sulphuric acid and propylene takes place according to the rule that the $HSO_4$ group unites with the carbon atom of the olefine compound which is combined with the lowest number of hydrogen atoms.

The reaction between isopropyl sulphuric acid and amylene to form the dialkyl sulphate, isopropyl amyl sulphate, takes place according to the following equation:

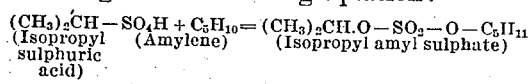
(Isopropyl sulphuric acid) (Amylene) (Isopropyl amyl sulphate)

In the reaction of olefines other than amylene with isopropyl sulphuric acid products similar to the above dialkyl sulphate are formed having the general formula:

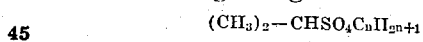

The invention may be best explained in connection with the accompanying drawing which is a "flow sheet" or a diagrammatic representation of the steps of the process whereby the invention is carried out.

Oil gas which preferably comes from the pressure stills of the ordinary refineries is first cooled in any desired manner and is then treated with an absorbing menstruum comprising mainly a mixture of isopropyl sulphuric acid and ethyl sulphuric acid, the absorbing menstruum having been derived from a later step in the process, as will be explained.

It is desirable that the reacting materials be in contact under pressure for a considerable period of time at a low temperature, preferably at or below 30° C. In order to accomplish the absorption under these conditions the oil gas is passed upwardly through a tower of the ordinary commercial type, the tower being cooled in any desired manner. The absorbing menstruum comprising isopropyl sulphuric acid and ethyl sulphuric acid is passed downwardly through the tower 1, as is indicated in the flow sheet, in a direction countercurrent to that of the gas. The tower 1 has a series of cooling coils therein for regulating the temperature of the liquid and gas passing therethrough, and has also a series of trays over which the liquid flows in order to come into intimate contact with the gas particles containing the olefines. By the prolonged contact of the gas and absorbing menstruum the alkyl sulphuric acids therein react with the olefines to produce the corresponding dialkyl sulphate illustrated by the equation 3 above, the reaction product being withdrawn at the bottom of the tower 1. The gas, from which the higher olefines have been removed, passes out of the top of the tower and is lead preferably to the bottom of a second tower, 2, similar to tower 1, in which an absorbing menstruum comprising mainly a mixture of sulphuric acid and ethyl sulphuric acid, is employed to abstract propylene from the oil gas. The reaction between the propylene in the gas and the sulphuric acid of the absorbing menstruum takes place according to equation 2 above to form isopropyl sulphuric acid. During the absorption of the propylene from the oil gas by means of the absorbing menstruum employed the temperature is maintained below 30° C. in order to minimize the polymerization of the olefines in the gas. If concentrated sulphuric acid is employed the temperature is maintained preferably below 20° C. If dilute sulphuric acid or a sulphuric acid having a gravity of from 1.65 to 1.8 is used however, higher temperatures may be employed in the absorption without danger of excessive polymerization of the olefines in the gas taking place. An absorbing menstruum consisting of gas oil or a comparatively high boiling petroleum distillate may be employed with sulphuric acid in place of the absorbing menstruum above mentioned, which will permit the use of higher temperatures during the absorption while minimizing the amount of polymerization taking place. If desired, the propylene may be recovered in an acid menstruum consisting of concentrated sulphuric acid and ethyl sulphuric acid substantially as described in the copending application of Born and Isham, Serial No. 294,013, filed May 1, 1919.

When using an absorbing menstruum consisting of ethyl sulphuric acid and sulphuric acid it is desirable to maintain the amount of free sulphuric acid as small as possible so that the alkyl sulphuric acid formed by the absorption of propylene will contain little, if any, free sulphuric acid and may be used in the first absorbing tower for removing olefines higher than propylene without further treatment.

The reaction product of the tower 2 is withdrawn through a pipe at the bottom of the tower and may be passed to storage or be pumped directly to the top of the tower 1 in amounts required for the reaction of the higher olefines with the absorbing menstruum. The oil gas from which both higher olefines and propylene have been abstracted is withdrawn from the top of the tower 2 and is passed into the bottom of a tower 3 having plates therein similar to towers 1 and 2. In order to absorb the ethylene in the oil gas concentrated sulphuric acid of substantially 60° Bé. is passed through the tower in a direction countercurrent to that of the gas passing therethrough. The best temperature for the absorption of ethylene is approximately 90° C., which is ordinarily attained through the heat evolved in the reaction. During cold weather, however, the heat of reaction will not be sufficient to raise the temperature to the required degree. Heating coils similar to the cooling coils of towers 1 and 2 may be employed in the tower 3 and may be used whenever necessary, in order to obtain the desired degree of heat during the absorption of the ethylene in the sulphuric acid. The oil gas from which now substantially all of the unsaturated hydrocarbons have been removed is withdrawn from the top of the tower and may be passed to storage or may be burned directly in suitable gas burners.

By the process outlined above a new product is obtained consisting of a normal alkyl sulphate containing two ethyl groups or an ethyl group, or an isopropyl group, and an alkyl group higher than the ethyl group such as a propyl, butyl, amyl, hexyl, or heptyl group. An alkyl sulphate is also obtained, derived from isopropyl sulphuric acid, containing an alkyl group such as the butyl, amyl, hexyl or heptyl group, forming thereby the corresponding isopropyl alkyl sulphate. Said new product is a mixture of dialkyl sulphates composed of molecules containing either an ethyl or an isopropyl group in each molecule and both the ethyl and isopropyl groups being present in the mixture. Said product is useful in forming esters of formic, acetic and like acids, it being easy to so conduct the esterification that esters of the heavier alcohols are formed together with an alkali alkyl sulphate. Said product, moreover, may be used to produce mixed ethers by careful distillation with a limited regulated amount of water. Other uses for said product will occur, no doubt, to those skilled in the chemical arts. The crude product which is formed in the first reaction chamber or tower 1 is a yellow liquid which is insoluble in water but is soluble in ether. The material may be hydrolyzed by boiling with water by which alcohols are produced and sulphuric acid is liberated. The alcohols which are thus formed may be used for the production of other chemical products in any reaction where alcohols may be employed as a starting material. The reaction of hydrolysis of dialkyl sulphates may be illustrated in the case of isopropyl amyl sulphate, for example, as taking place according to the following equation:

4. 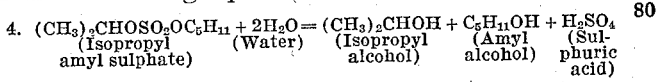

If it is desired to obtain single or unmixed alcohols, the alcohols may be separated by distillation and rectification according to the usual procedure. The secondary alcohols which are formed in the reaction may be oxidized if desired to the corresponding ketones by the ordinary chemical methods of oxidation.

Under certain conditions of operation it may be advisable to modify the process by recovering ethylene in oil gas in a manner different from that above described. The process may also be modified by not recovering the ethylene at all, but allowing it to pass with the gas, after the absorption of propylene and higher olefines therefrom, to storage, or to burners, where it will be burned together with the gas. In the modification in which ethylene is not recovered the process will be carried on in the following manner: Oil gas from the pressure stills is cooled and treated with isopropyl sulphuric acid to remove the higher olefines from the oil gas in the tower 1. The amount of isopropyl sulphuric acid employed in the absorption tower can be regulated so as to produce substantially nothing but isopropyl alkyl sulphate with the higher olefines in the gas. The reaction product is withdrawn at the bottom of tower 1 while the gas from which the higher olefines have been removed passes out at the top of the tower and is led to the bottom of the tower 2 through which it passes in a countercurrent direction to the propylene absorbing medium. In place of using ethly sulphuric acid or a mixture of ethly sulphuric acid and sulphuric acid, as in the preferred form of the invention to absorb propylene, sulphuric acid alone is employed at a temperature from 10° to 30° C. as the absorbing medium. The amount of acid may be regulated so as to obtain substantially isopropyl sulphuric acid with no appreciable amount of free sulphuric acid. By regulating the amount of sulphuric acid employed so as to avoid the presence of free sulphuric acid there will be a small amount of di-isopropyl sulphate present which however will not interfere in the subsequent reaction with the higher olefines and will act merely as a neutral inactive material. The isopropyl sulphuric acid or reaction product formed in the tower 2 is withdrawn through a pipe at the bottom of the tower and is preferably passed to storage from which the amounts required for the reaction in the tower 1 may be withdrawn and supplied thereto at the desired rate. The oil gas from which the higher olefines and propylene have been abstracted is withdrawn from the top of the tower 2 and passes from thence to storage or to burners. This process as outlined will be employed when the price of ethyl alcohol is so low or when the cost of abstracting ethylene is so high that it would not pay to recover the ethylene.

Various modifications may be made in the processes as described to produce dialkyl sulphates and other valuable reaction products without departing from the spirit or scope of the invention, as will be apparent to one skilled in the art. It is desired therefore not to limit the invention to the procedure as described except as defined in the claims.

Having thus described the invention, what is claimed as new is:

1. A process of extracting unsaturated hydrocarbons from oil gas which comprises passing oil gas through an absorbing solution comprising a mixture of alkyl sulphuric acids to absorb the higher olefines therefrom, said solution being essentially free of active constituents other than alkyl sulfuric acids, thereafter passing the gas through an absorbing solution comprising ethyl sulphuric acid to absorb propylene therefrom, and finally passing the gas into contact with concentrated sulphuric acid to absorb ethylene from the gas, all said steps being carried out under sulphating conditions.

2. A process of extracting unsaturated hydrocarbons from oil gas which comprises passing oil gas through an absorbing solution comprising ethyl sulphuric acid and isopropyl sulphuric acid to absorb higher olefines from the said oil gas, said solution being essentially free of active constituents other than alkyl sulfuric acids, thereafter passing the gas through an absorbing solution comprising ethyl sulphuric acid to absorb propylene therefrom and to obtain the solution to be employed for the absorption of higher olefines, finally passing the gas into contact with concentrated sulphuric acid to absorb ethylene from the gas, all said steps being carried out under sulphating conditions.

3. A process of stripping gas which comprises passing gas containing ethylene but from which propylene and higher olefines have been removed, into contact with sulphuric acid of approximately 66° Bé. strength at a temperature of approximately 90° C. to absorb ethylene from the gas, forming a solution comprising ethyl sulphuric acid, cooling the solution obtained thereby, thereafter passing gas containing ethylene and propylene but from which higher olefines have been removed, into contact with the cooled solution to absorb propylene therefrom, and thereby forming a solution comprising a mixture of ethyl sulphuric acid and isopropyl sulphuric acid, said second solution being essentially free of active constituents other than alkyl sulfuric acids, finally passing gas containing ethylene, propylene, and higher olefines into contact with the solution of mixed alkyl sulphuric acids to obtain dialkyl sulphates, and separating the solution so obtained, all said steps being carried out under sulphating conditions.

4. A process of extracting unsaturated hydrocarbons from oil gas comprising passing the gas under sulphating conditions through an absorbing menstruum essentially free of active constituents other than alkyl sulphuric acid and then passing the remaining gas through sulphuric acid under sulfating conditions.

5. A process of extracting unsaturated hydrocarbons from oil gas comprising passing the gas under sulphating conditions through two different alkyl sulphuric acid absorbing menstruums and then passing the remaining gas through a sulphuric acid menstruum under sulfating conditions.

6. A process of extracting olefines in the olefine series higher than ethylenes from oil gas comprising passing the gas under sulphating conditions through an absorbing menstruum consisting essentially of alkyl sulphuric acid, said absorbing menstruum comprising ethyl sulphuric acid and being essentially free of active constituents other than alkyl sulfuric acids.

7. A process of extracting unsaturated hydrocarbons from oil gas, comprising passing the gas under sulphating conditions through an absorbing menstruum consisting essentially of alkyl sulphuric acid, said absorbing menstruum comprising ethyl and isopropyl sulphuric acids and being essentially free of active constituents other than alkyl sulfuric acids.

8. A process of separating butylene, amylene, hexylene and heptylene from oil gas comprising treating the gas under sulphating conditions and under pressure with an acid menstruum comprising isopropyl sulphuric acid at a temperature below 30° C.

9. A process of extracting olefines higher in the olefine series than propylene from oil gas comprising treating the gas under sulphating conditions and under pressure with an acid menstruum comprising ethyl and isopropyl sulphuric acids at a temperature below 30° C.

10. A process of separating olefines from oil gas which comprises treating the oil gas with an acid mentsruum including isopropyl sulphuric acid to abstract higher olefines therefrom, thereafter treating the oil gas with fluid containing sulphuric acid as an active constituent to abstract propylene therefrom and to obtain an acid menstruum of isopropyl sulphuric acid and employing the menstruum so obtained for the first absorption to remove the higher olefines from the gas, all said steps being carried out under sulphating conditions.

11. A process of separating olefines from oil gas comprising cooling the gas, passing the gas under pressure into intimate contact with an acid reacting menstruum containing mineral acid radicals but less reactive than sulfuric acid of equal concentration at a temperature below 30° C. to absorb higher unsaturated olefines therefrom, and passing the gas into intimate contact with liquid containing sulphuric acid at a temperature below 30° C. to remove propylene therefrom, all said steps being carried out under esterfying conditions.

12. A process of producing dialkyl sulphates from oil gas which comprises cooling the gas containing amylene and other higher olefines to a temperature below 30° C. under pressure and thereafter passing the gas into contact with isopropyl sulphuric acid under sulphating conditions.

13. As a composition of matter, a mixture of dialkyl sulfates composed of molecules containing an alkyl group having more than one and not more than three carbon atoms in each molecule and both ethyl and isopropyl groups being present in the mixture.

14. A process of separating propylene, amylene, hexylene and heptylene from oil gas comprising treating the gas under sulfating conditions with an acid menstruum comprising isopropyl sulfuric acid at a temperature below 30° C.

15. A process of extracting olefines higher in the olefine series than propylene from oil gas, comprising treating the gas under sulfating conditions with an acid menstruum comprising ethyl and isopropyl sulfuric acids at a temperature below 30° C.

16. The process of forming dialkyl sulfates comprising passing a sulfuric acid menstruum countercurrent to and in contact with an olefine-containing gas under sulfating conditions until the liquid menstruum is essentially free of active constituents other than alkyl sulfuric acid, and passing said alkyl sulfuric acid menstruum in contact with and countercurrent to olefine containing gas under sulfating conditions to form dialkyl sulfates from said olefine-containing gas.

In testimony whereof I affix my signature.

ROBERT M. ISHAM.

CERTIFICATE OF CORRECTION.

Patent No. 1,744,227. Granted January 21, 1930, to

ROBERT M. ISHAM.

It is hereby certified that error appears in the printed specification of the above numbered patent requiring correction as follows: Page 3, line 20, for "60°" read "66°"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.